United States Patent [19]

Bretenaker et al.

[11] Patent Number: 5,091,912
[45] Date of Patent: Feb. 25, 1992

[54] LASER HAVING TWO MODES AT DIFFERENT FREQUENCIES

[75] Inventors: Fabien Bretenaker, Paris; Albert Le Floch, Rennes Cedex, both of France

[73] Assignee: Societe D'Applications Generales D'Electricite et De Mecanique Sagem, Paris Cedex, France

[21] Appl. No.: 653,636

[22] Filed: Feb. 12, 1991

[30] Foreign Application Priority Data

Feb. 13, 1990 [FR] France .................... 90 01687

[51] Int. Cl.[5] ............................................ H01S 3/10
[52] U.S. Cl. ........................................ 372/23; 372/20; 372/105; 372/106
[58] Field of Search .................. 372/23, 105, 106, 20

[56] References Cited

U.S. PATENT DOCUMENTS

| | | | |
|---|---|---|---|
| 3,506,362 | 4/1970 | Doyle et al. | 356/111 |
| 4,441,186 | 4/1984 | Erickson | 372/23 |
| 4,637,027 | 1/1987 | Shirasaki et al. | 372/23 |

OTHER PUBLICATIONS

"Two Frequency Gas Lasers in Mutually Orthogonal Transverse Magnetic Fields" by Gudelev et al, Sov. J. Quantum Electron 18(2), Feb. 1988.

*Primary Examiner*—James W. Davie
*Attorney, Agent, or Firm*—Larson & Taylor

[57] ABSTRACT

A laser for use in all fields of measurement using a heterodyne effect delivers two waves at different frequencies, having mutually orthogonal linear polarizations. It comprises a lasing medium placed in a laser resonating cavity defined by mirrors and a birefringent crystal placed on the path of the two waves. The lasing medium is located in the resonating cavity in a zone where the two waves are separated spatially. Two quarter wave plates, one of which has neutral lines at substantially 45° from the polarization axes of the birefringent means, are placed in the common path of the two waves so as to give a helical polarization to the two waves between the plates.

9 Claims, 1 Drawing Sheet

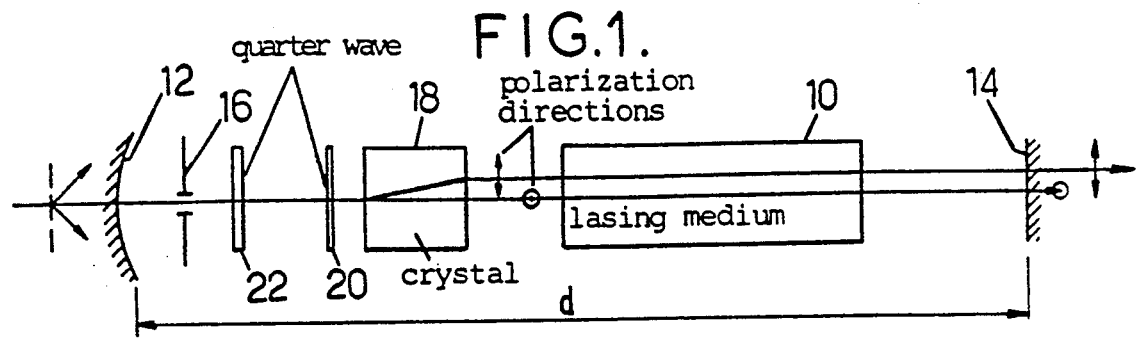
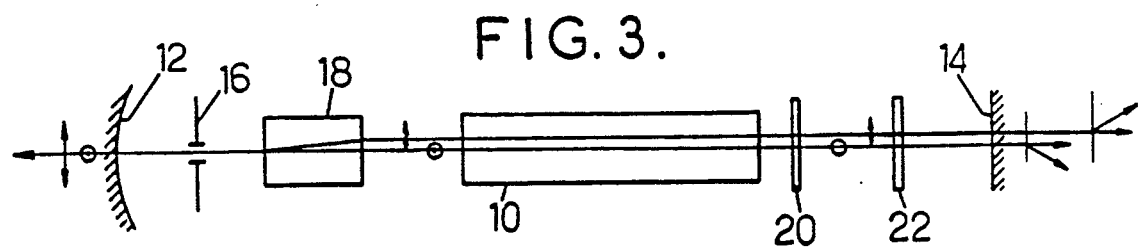
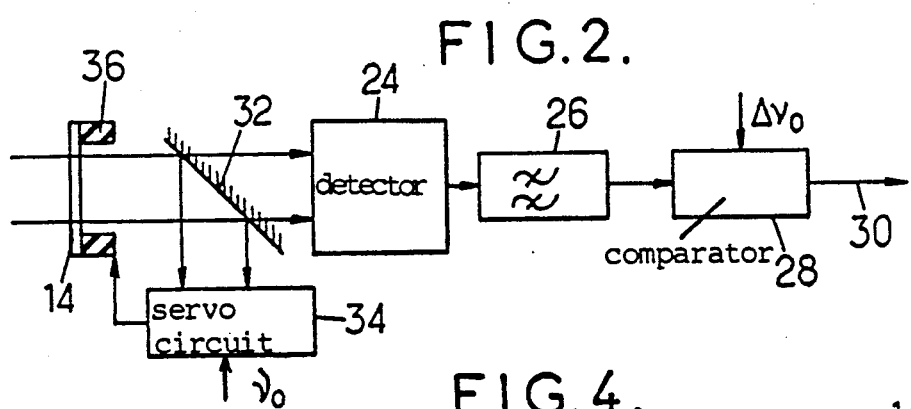
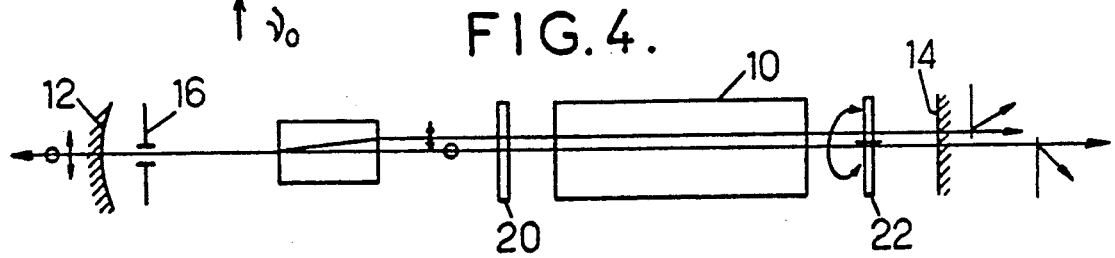
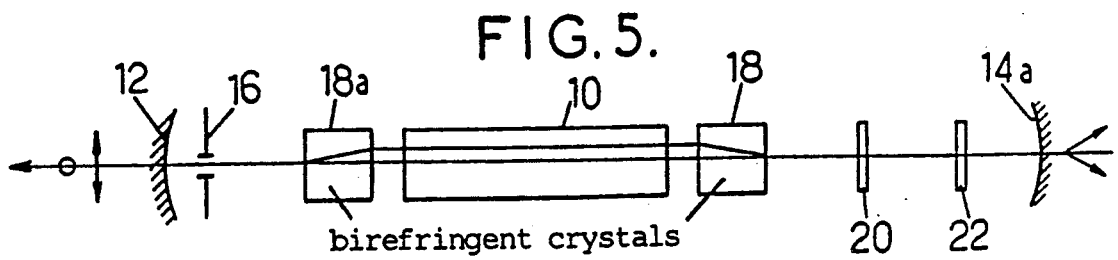

LASER HAVING TWO MODES AT DIFFERENT FREQUENCIES

BACKGROUND OF THE INVENTION

The present invention relates to a laser delivering two waves at different frequencies, which are close to each other. It is suitable for use in all fields of measurement using a heterodyne effect, particularly in metrology; it is also applicable in optical spectrometry.

Lasers are already known delivering two waves at different frequencies, having mutually orthogonal linear polarizations, comprising a lasing medium placed in a laser resonating cavity defined by mirrors and associated with means for exciting the laser medium and comprising birefringent means placed on the path of the two waves.

The article "Two frequency gas lasers in mutually orthogonal transverse magnetic fields" by Gudelev et al, Sov. J. Quantum electron 18(2), February 1988, page 166 discloses a helium-neon gas discharge laser of the above type, in which separate zones of the active lasing medium are subjected to mutually orthogonal magnetic fields, the birefringent means being formed by one of two windows defining the cavity, subjected to a compression stress.

With such a laser, in effect, two waves can be obtained having a frequency difference related to the phase linear anisotropy, which may reach 50 MHz in the example given in the above document, using a resonant cavity 31 cm long.

Apart from its complexity, the laser described in the above document, as well as other lasers already proposed for generating two waves at different frequencies, have drawbacks. Since the optical path is the same for the two waves, the oscillation modes are very highly coupled and it is difficult to obtain simultaneous oscillations in the two inherent states without mutual interaction. Adjustment of the frequency difference is difficult and unreliable, for it is achieved by modifying a stress which is difficult to evaluate rather than by moving of a component.

SUMMARY OF THE INVENTION

An object of the present invention is to provide a two-frequency gas laser of the above defined type in which the two waves are sufficiently decoupled in the lasing medium so that locking phenomena are very greatly reduced.

To this end, there is provided a laser wherein the lasing medium is located in the resonating cavity in a zone where the two waves are separated spatially and wherein two quarter wave plates, one of which has neutral lines at substantially 45° from the polarization axes of the birefringent means, are placed in the common path of the two waves so as to give a helicoidal polarization to the two waves between the plates.

By orienting that quarter wave plate which is closer to the birefringent component at 45° from the polarization axes of this component, the light intensities of the two waves may be balanced and elliptical polarization is avoided. The two waves correspond to two inherent states operating independently from each other, because the waves are separated spatially in the lasing medium. The quarter wave plates and the birefringent means may be placed so that the paths of the two waves are separated spatially throughout the whole laser resonating cavity, but it is not essential to fulfil this condition, which involves constraints.

An ancillary object of the invention is to make it possible to adjust the difference between the two frequencies easily, in a range from zero up to a value related to the intermode interval of the cavity; the result is achieved by rotating the quarter wave plate farther away from the birefringent means, whose orientation has only little influence on the balance between the amplitudes of the waves. Such adjustment may be complemented by adjusting the length of the cavity for adjusting the mean frequency of the two waves, i.e. of the two inherent states of the cavity. Because the mean frequency variations remain always very small, the plates remain substantially quarter wave during such adjustment.

The birefringent means will generally be a crystal of usual type, for separating a non-polarized incident beam into an ordinary beam and an extraordinary beam having mutually perpendicular rectilinear polarizations. It is not necessary that for the polarizations of the ordinary and extraordinary beams be absolute, for the polarization is reinforced by operation of the resonant cavity and of the active lasing medium.

The invention can be used in lasers of different types; it is however particularly suitable for use in gas discharge lasers or even in dye lasers.

The invention will be better understood from the following description of particular embodiments of the invention, given by way of examples.

BRIEF DESCRIPTION OF THE DRAWINGS

FIG. 1 is a schematic representation, in which the scale has not been respected, showing the relative arrangement of the main components of a laser according to a first embodiment;

FIG. 2 is a black diagram of an adjustment circuit which can be used with the laser of FIG. 1;

FIGS. 3, 4 and 5, similar to FIG. 1, show modified embodiments.

DETAILED DESCRIPTION OF PREFERRED EMBODIMENTS

The laser of FIG. 1 conventionally comprises an enclosure 10 containing the lasing medium, placed in a resonating cavity defined by mirrors 12 and 14 having a reflection coefficient close to 100% at the mean operating frequency of the laser. In a well-known arrangement, one of the mirrors 14 is flat whereas the other mirror 12 is spherically concave and centered on mirror 14. A diaphragm 16 placed close to concave mirror 12 selects the fundamental transverse mode $TEM_{00}$. The means for causing a laser action, for instance for causing gas discharge using a RF current, are provided. They will not be described since they can be fully conventional.

According to an aspect of the invention, the cavity contains the means necessary for generating two waves at different frequencies. As shown in FIG. 1, the position of diaphragm 16 and that of the components are such that the inherent states, i.e. the paths of the waves, are separated spatially in a fraction of the cavity defined by mirror 14 which consequently is a flat mirror.

The means for generating two waves having separate paths in the lasing medium comprise a flat birefringent crystal 18 having its polarization axes which will be assumed to be respectively parallel and perpendicular to the plane of the drawing. A first plate 20, which is quarter wave for the mean frequency of the two modes, is placed in close proximity to the birefringent crystal 18, on the side of this crystal where the ordinary beam and the extraordinary beam follow the same path. The neutral lines of the quarter wave plate 20 are at 45° from the polarization axes of the birefringent cristal 18, so as to balance the light intensities of the two modes excited in the lasing cavity. A second quarter wave plate 22, also placed in the common path of the two beams, is more remote from component 18 than plate 20. If it is desired to adjust the difference $\Delta\nu$ between the natural frequencies of the two modes, plate 22 is arranged to be angularly adjustable about the direcrtion of the light beams.

If the folowing notations are used:
c: speed of light,
d: length of the resonating cavity
$\rho$: angle which the neutral lines of the plate 22 forms with the polarization axes of crystal 18,
$\phi$: the phase difference of the extraordinary wave and the ordinary wave caused by passing through the crystal.

Then the difference $\Delta\nu$ between the natural frequencies is :

$$\Delta\nu=(c/2d)[(2\rho/\pi)-(\phi/\pi)-(\tfrac{1}{2})] \quad (1)$$

Formula (1) shows that the frequency difference $\Delta\nu$ can be adjusted throughout the whole interval from zero to c/2d, i.e. in the free spectral interval of the cavity between two modes. In practice however, locking effects prevent the difference from being reduced below a threshold which, in general, is a few KHz.

The laser may be provided with means for automatically maintaining the frequency difference at a set value, by controlling the angular position of plate 22. It may also be provided with means for adjusting and/or stabilizing the mean frequency of the two inherent states in a range which is limited by the variation of the gain in the laser medium responsive to length. FIG. 2 shows schematically a circuit for automatically maintaining the mean value (average between the two frequencies) at a value $\nu 0$ and the difference to a value $\Delta\nu 0$; the two values may be adjustable by manually actuated units delivering set values $\nu 0$ and $\Delta\nu 0$ as electrical signals.

The circuit shown in FIG. 2 comprises, for that purpose, a detector 24 for causing the two waves to optical beat and delivering a signal at a beat frequency. The detector may conmbine leak fluxes through mirror 14. The beat frequency is isolated a filter 26 to which the output signal of detector 24 is applied. A comparator 28 for comparison between the signal representative of the actual difference of the frequencies and a reference value $\Delta\nu 0$ delivers, at its output 30, an error signal which is used for controlling a means for rotating plate 22, such as a step-by-step motor (not shown).

A fraction of the light of the waves may be separated before it reaches the detector by a semi-transparent plate 32 and directed to a circuit 34 for automatically controlling the wavelength. The circuit has conventioned means for determining the mean frequency, comparing it with $\nu 0$ and adjusting a parameter. Typically it adjusts the length d of the cavity by acting on a piezoelectric ceramic 36 carrying mirror 14, so as to balance the intensities of the two waves.

In the space between the two quarter wave plates 20 and 22, the two standing waves have a helical polarization. On the other hand, the two waves have crossed polarizations, each at 45° from the neutral lines of the adjacent quarter wave plate, outside this space. Consequently, in the laser of FIG. 1:

the two orthogonal polarization directions depend on the orientation of plate 22 located close to mirror 12, where the optical propagation paths merge, the crossed polarization axes correspond to the polarization axes of the birefringent crystal 18 in the lasing medium 10 and at the output of partially transparent mirror 14.

Depending on the properties it is desired to obtain for the output beams, the embodiment of FIG. 1 or one of those which will now be described will be selected; it particularly depends whether it is desired to obtain:

fixed polarizations or polarizations controlled by the orientation of plate 22, optical propagation paths which are merged or separate on one side and/or on the other side of the resonating lasing cavity.

Referring to FIG. 3 (where the elements corresponding to those of FIG. 1 are designated by the same reference numbers) the quarter wave plates 20 and 22 are placed between the lasing medium in enclosure 10 and the flat mirror 14. The quarter wave plate 20 closer to the birefringent crystal 18 has neutral lines at 45° from the polarization directions of crystal 18. In this embodiment, the polarization directions of the waves leaving the laser cavity through the flat mirror 14 and following the different optical paths rotate if plate 22 is rotated.

In the embodiment of FIG. 4, the quarter wave plates 20 and 22 are each placed on one side of the lasing medium 10, which leads to polarizations having the same properties as in FIG. 3.

In the embodiment of FIG. 5, the means for generating two modes are arranged so that the zone of the cavity 10 in which the inherent oscillation states are separated spatially reach neither of the two mirrors 12 and 14a, which may consequently be concave mirrors. Such means comprise a second birefringent crystal 18a, identical to the first one, placed in the cavity so that the propagation paths of the two inherent states are merged outside a zone straddling the active lasing medium, in particular close to the two mirrors; the system thus formed has a better immunity to deformation of the cavity.

In the embodiment of FIG. 5, the frequency difference $\Delta\nu$ is given by the formula :

$$\Delta\nu=(c/2d)[(2\rho/\pi)-(2\phi/\pi)-(\tfrac{1}{2})] \quad \text{(1bis)}$$

It is again theoretically adjustable between 0 and c/2d.

The above description shows that the components to be added to the conventional components of a laser are simple.

As an example the laser may comprise a tube for discharge in a He-Ne mixture, at 3.39 $\mu$m or 633 nm, a birefringent crystal and two quarter wave plates defining a space which does not contain the crystal, but may either contain the active medium (FIG. 4) or not (FIGS. 1, 3 and 5). But, in all cases, two simultaneous inherent states decoupled spatially in the active lasing medium appear.

We claim:

1. Laser for delivery of two waves having different frequencies and mutually orthogonal linear polarization directions, comprising:

a laser resonating cavity defined by two mirrors;

a lasing medium located in only a portion of said laser resonating cavity for being traversed by light reflected between said two mirrors;

birefringent means located outside said portion and traversed by said light for separating said light into two waves having parallel paths when said light is in a first direction and recombining the light from said two paths into a common path when said light is in an opposite direction, said portion being so located with respect to said birefringent means that the light is separated in two parallel paths throughout said portion; and two quarter-wave plates located for being traversed by said light along said two paths, one of said quarter wave plates having neutral lines at approximately 45° from the polarization axes of the birefringent means, whereby the two waves are helically polarized between the two quarter-wave plates.

2. Laser according to claim 1, wherein said quarter-wave plates and said birefringent means are placed so that the paths of the two waves are separated spatially throughout the whole laser resonating cavity.

3. Laser according to claim 1, wherein said one of said quarter waves is closer to the birefringent means than the other of said quarter wave plates and on a same side of said birefringent means.

4. Laser according to claim 3, wherein said other of said quarter wave plates is angularly adjustable.

5. Laser according to claim 4, further comprising means for automatically controlling the angular position of said other of said quarter wave plates for maintaining the frequency difference between the two waves at a predetermined value.

6. Laser according to claim 5, wherein said control means comprise means for beating the two waves, means for measuring the beat frequency between the two waves and means for controlling the angular position of said other of said quarter wave plates for rendering said beat frequency equal to a reference frequency.

7. Laser according to claim 1, wherein said lasing medium is located between said birefringent means and additional birefringent means.

8. Laser according to claim 1, wherein said birefringent means is a crystal.

9. Laser according to claim 1, wherein the other one of said quarter wave plates, said one of said quarter wave plates, a birefringent crystal constituting said birefringent means and said lasing medium are placed in series relation between a spherically concave mirror and a partially transparent flat mirror.

* * * * *